United States Patent [19]

Doukas

[11] Patent Number: 5,678,075
[45] Date of Patent: Oct. 14, 1997

[54] CAMERA ACCESSORY FOR CONTROLLING AN EXTERNAL STROBE

[75] Inventor: Michael P. Doukas, Franklin, Mass.

[73] Assignee: Polaroid Corporation, Cambridge, Mass.

[21] Appl. No.: 657,635

[22] Filed: May 30, 1996

[51] Int. Cl.⁶ ........................................ G03B 15/03
[52] U.S. Cl. .................... 396/171; 396/182; 396/198; 362/13
[58] Field of Search ...................... 354/83, 126, 132, 354/148; 396/155, 157, 162, 171, 172, 176, 182, 198; 362/3, 13, 16, 8

[56] References Cited

U.S. PATENT DOCUMENTS

| | | | |
|---|---|---|---|
| 3,832,725 | 8/1974 | Cook | 354/64 |
| 3,943,532 | 3/1976 | De Filippis | 354/126 |
| 3,961,349 | 6/1976 | Forsyth et al. | 354/295 |
| 3,962,711 | 6/1976 | Cutler, Jr. | 354/295 |
| 4,381,144 | 4/1983 | Breslau | 354/64 |
| 4,707,106 | 11/1987 | Johnson et al. | 354/481 |
| 4,816,850 | 3/1989 | Philipeaux et al. | 354/127.1 |
| 5,023,639 | 6/1991 | Ushiro et al. | 354/132 |
| 5,229,801 | 7/1993 | VanDeMoere | 354/222 |

OTHER PUBLICATIONS

Calumet Photographic, Inc., 890 Supreme Drive, Bensonville, ILL. 60106 (1996 Catalog, p. 36).
The Polaroid Letter for Law Enforcement Officials, vol. II, Spring 1992.

*Primary Examiner*—Safet Metjahic
*Assistant Examiner*—Christopher E. Mahoney
*Attorney, Agent, or Firm*—Robert A. Sabourin

[57] ABSTRACT

An easy to use camera accessory, when mounted onto a camera, will trigger an external strobe upon excitation of a built-in electronic flash while simultaneously blocking from the scene the light emitted by the built-in electronic flash. The camera accessory typically is snap-in mountable and includes: a flash slave for triggering the external strobe, a PC connector for connection via a cable with the external strobe, and openings for camera features including, but not limited to, a lens, a sonar detection device, a viewfinder and a photocell. Light emitted from the built in electronic flash is physically blocked from being cast upon the scene. A more basic version of the inventive camera accessory does not require the camera feature openings.

12 Claims, 4 Drawing Sheets

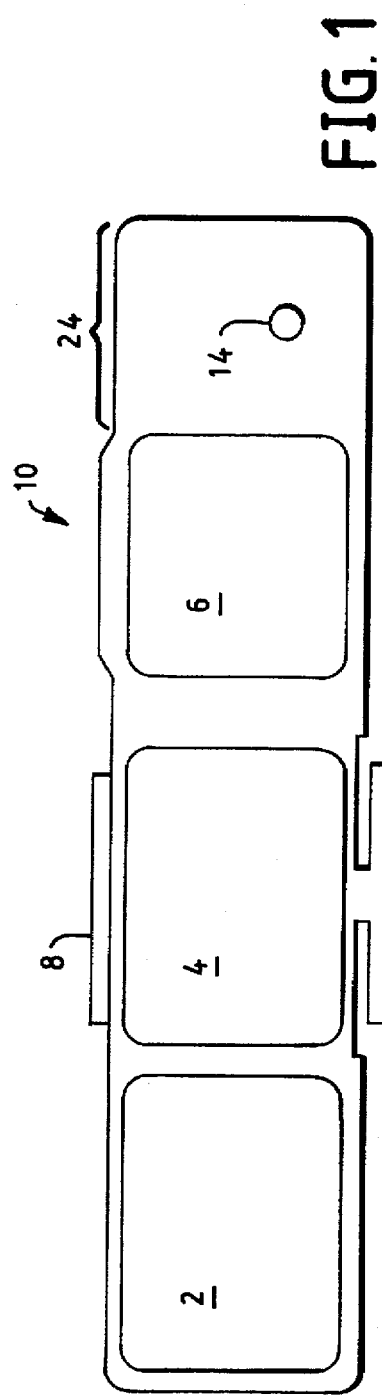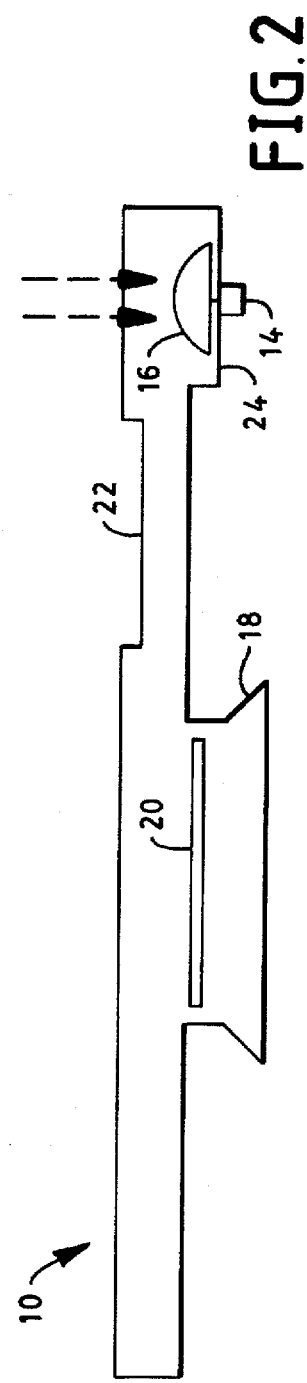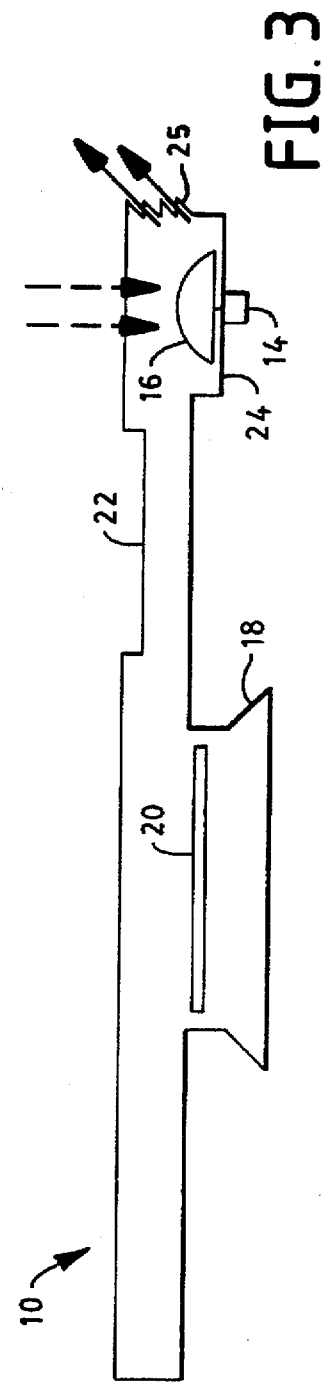

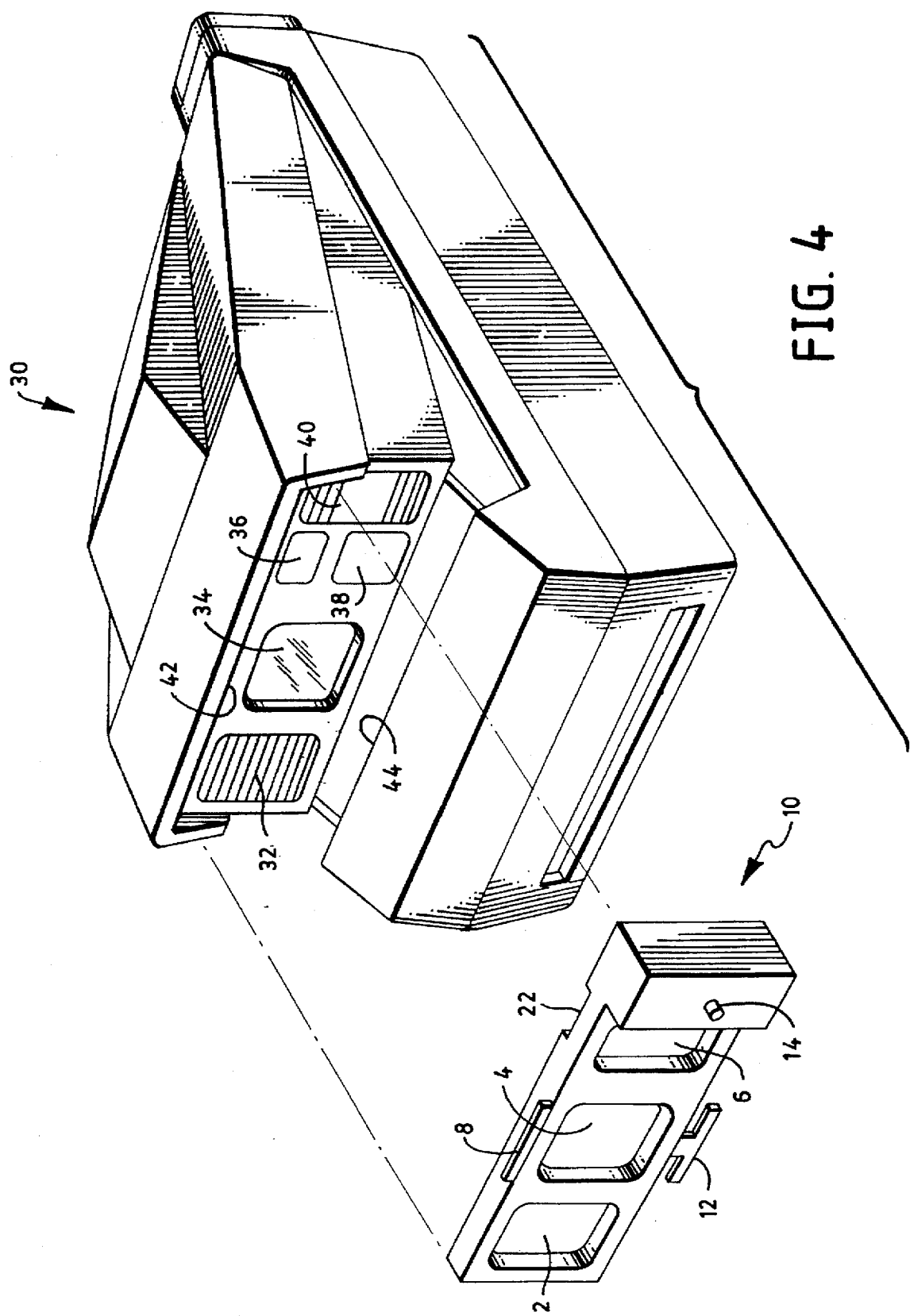

CAMERA ACCESSORY FOR CONTROLLING AN EXTERNAL STROBE

BACKGROUND OF THE INVENTION

This invention concerns an accessory for controlling an external strobe for a camera having an electronic flash.

At times the built-in electronic flash of a camera may provide inadequate lighting for taking an acceptable photograph. This is specifically the case at night when there is low lighting, or when the scene includes photographic subjects which are beyond the maximum distance from the camera for the built-in electronic flash to be effective. Also, photographers at times desire greater illumination to eliminate shadows or to create a particular artistic effect. In these and other situations, the built-in electronic flash is often inadequate to provide the desired lighting of the scene, thus a more powerful strobe external to the camera is needed.

Another reason for using an external strobe rather than a built-in electronic flash is the reduction or elimination of redeye. It is well known that using an external strobe eliminates or minimizes redeye.

Numerous camera accessories have been developed over the years to accommodate an external flash. For example the Polaroid Spectra (a registered trademark of Polaroid Corp.) camera, which has a built-in electronic flash, can also accommodate an external strobe such as a Vivitar 285. A hand grip screws into the bottom of the camera, and needs a "shoe connector" to hold the external flash in position—otherwise, the flash must be held in hand. A photo flash slave such as the Wein PN XL is attached to the camera with Velcro and positioned to be activated by the on-camera flash. A cord is connected between the flash slave and the external slave. Hence when a photograph is taken, the light from the built-in flash is optically received by the flash slave which in turn activates the external strobe so that both the internal and external flashes operate simultaneously, and light from both flashes is simultaneously cast upon the scene. The light from the built-in electronic flash can be completely negated by placing an infrared 87C filter over the Spectra flash.

U.S. Pat. No. 5,023,639 issued to Ushiro and Ohmura on Jun. 11, 1991 discloses a slave electronic flash unit which is removably mounted on a camera having a built-in electronic flash. An auxiliary flash is generated when a photosensor detects the light from the built-in flash. In other words, both the built-in flash and the external flash simultaneously emit light to the scene for imaging.

It is an object of the present invention to provide an easy to use camera accessory for controlling an external strobe activated by a built-in electronic flash using a flash slave, while simultaneously preventing the light from the built-in flash from being cast upon the scene without the use of an infrared filter.

SUMMARY OF THE INVENTION

An easy to use camera accessory, when mounted onto a camera, will trigger an external strobe upon excitation of a built-in electronic flash while simultaneously blocking from the scene the light emitted by the built-in electronic flash. The camera accessory typically is snap-in mountable and includes: a flash slave for triggering the external strobe; a connector for connection via a cable with the external strobe; means for blocking light emitted from the built-in electronic flash from being cast upon the scene, and openings for camera features including, but not limited to, a lens, a sonar detection device, a viewfinder and a photocell. A more basic version of the inventive camera accessory does not require the camera feature openings.

BRIEF DESCRIPTION OF THE DRAWINGS

The aforementioned aspects and other features of the invention are described in detail in conjunction with the accompanying drawings in which the same reference characters are used throughout for denoting corresponding elements and wherein:

FIG. 1 is a front view of a first embodiment of the inventive camera accessory which fits onto a Polaroid Spectra camera;

FIG. 2 is a top view of a second embodiment of the camera accessory of FIG. 1;

FIG. 3 is a top view of a third embodiment of the camera accessory of FIG. 1;

FIG. 4 shows perspective views of a Polaroid Spectra camera and the camera accessory of FIG. 1 prior to mounting;

DETAILED DESCRIPTION OF THE PREFERRED EMBODIMENTS

Figure 5:
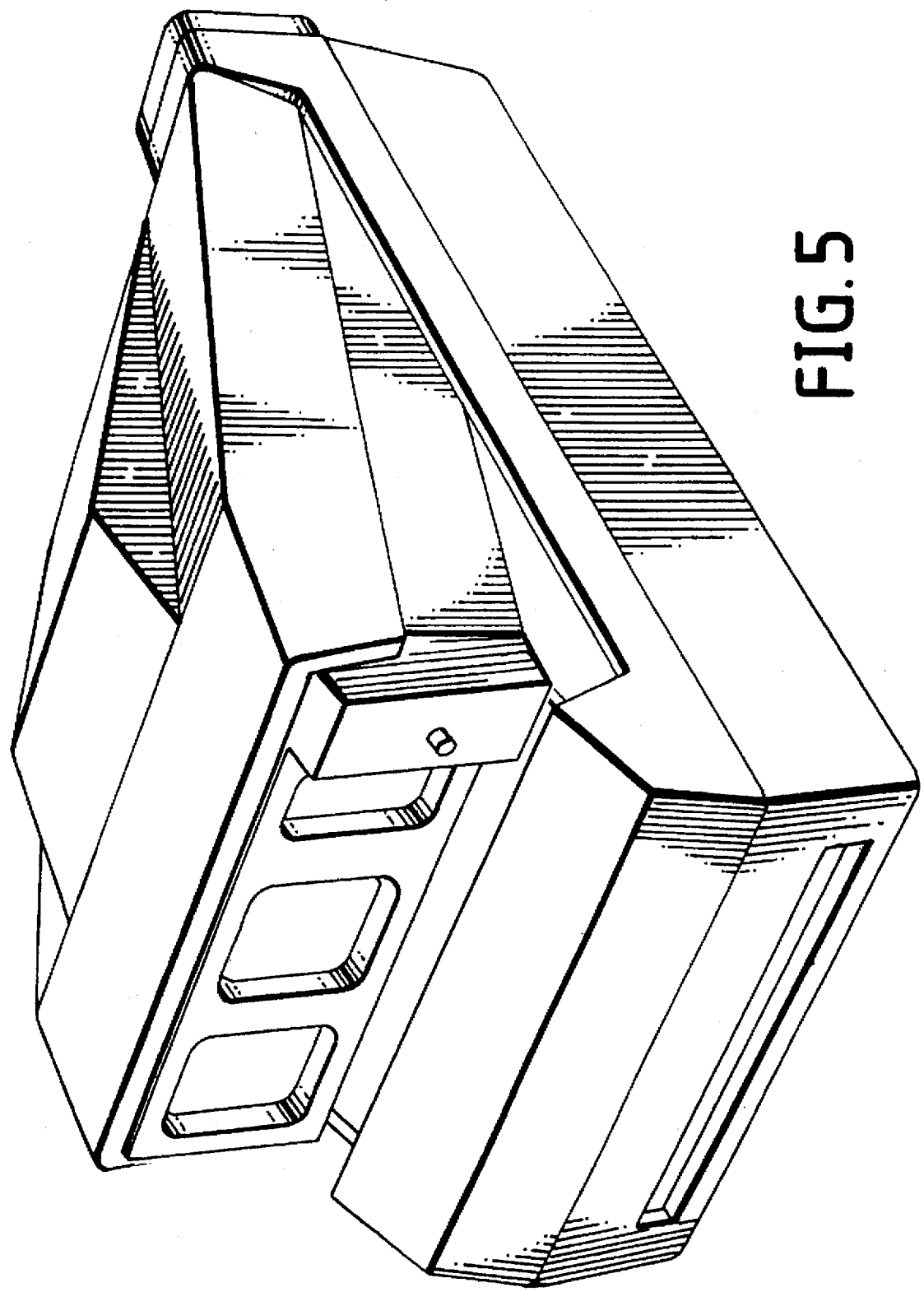
FIG. 5 shows a perspective view of a Polaroid Spectra camera with the camera accessory of FIG. 1 mounted thereon.

FIG. 1 shows a front view of a first embodiment of an inventive camera accessory 10 that fits onto a Polaroid Spectra camera. Referring also to FIG. 4, a sonar opening 2 aligns with a sonar device 32, a lens opening 4 aligns with a lens 34, a viewer opening 6 aligns with both a viewfinder 38 and a photocell 36, and an electronic built-in flash 40 aligns with section 24 of the camera accessory 10. The camera accessory 10 mounts onto the Spectra camera as shown in FIG. 5 by a press fit. A ridge 8 snaps under edge 42 and a ridge 26 of the mounting tab 12 snaps under the edge 44 of the Spectra camera. Indent 22 is fitted for the camera. Section 24 contains a flash slave 16 (see FIG. 2) such as a commercially available Wein Peanut. The flash slave, upon detecting light emitted from the built-in electronic flash 40 through an opening in the rear of section 24, acts as a relay by closing a switch connected across the connector 14. The closing of the optically controlled switch in turn activates an external strobe, such as a Vivitar 285, which is connected via a cable to connector 14. The section 24 of the camera accessory 10 blocks the light emitted from the built-in electronic flash 40 from being cast upon the scene. Hence, the scene is only lighted by the external flash, i.e. an off-flash, plus ambient lighting and the deleterious effects of using a built-in flash, i.e. an on-flash, are negated.

The camera accessory 10 of FIG. 1 can be slightly modified as shown in FIG. 2 to include a lens shade 18 and a filter slot 20 for inserting various filters in front of the lens 34. Another modification of the camera accessory of FIG. 3 could include an opening in the side of section 24 which would allow some of the incoming light (shown by dotted arrows) from the electronic built-in flash 40 to escape through the side of the camera (away from the scene as shown by solid arrows), thus preventing overheating of the camera accessory 10 during protracted use. The opening for releasing light could contain louvers 25 for redirecting the light, or the section 24 could contain a reflective material (not shown) for similarly redirecting the light away from the scene.

The key features of the easy to use inventive camera accessory include: mounting means; means for blocking the light emitted from the built-in electronic flash from being cast upon the scene; and optical sensing means for activating an external strobe upon sensing the light emitted from the built-in electronic flash. This type of camera accessory can be retrofitted for mounting onto most any camera, either conventional or instant. The mounting means shown in the above example (mounting tab 12 and ridge 8) are particular for easy mounting onto the Spectra camera, but any known mounting means could be used as appropriate for mounting the camera accessory onto any particular camera.

Figure 6A:
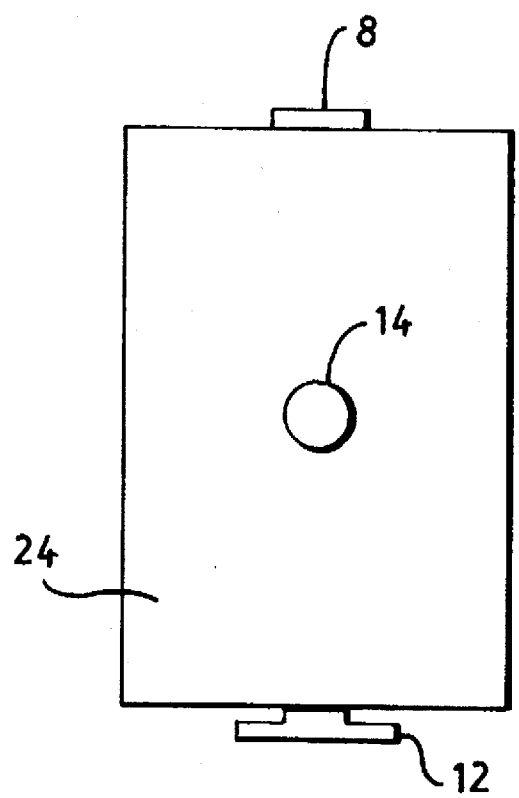
FIG. 6A shows a front view of an alternative embodiment of the inventive camera accessory.
Figure 6B:
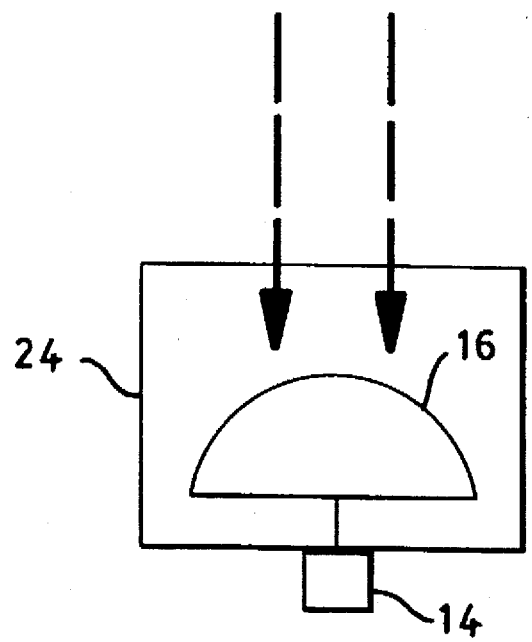
FIG. 6B shows a top view of the camera accessory of FIG. 6A.

The most basic representation of the features of the invention are shown in the front view sketch of FIG. 6A and the top view sketch of FIG. 6B. A flash slave 16 is situated in a housing 24 and connected to a connector 14. The housing 24 will be mounted in front of an electronic built-in flash of a camera so that light emitted from the flash (indicated by dotted arrows) will activate the optically sensing flash slave 16 thereby creating electrical continuity through the connector 14 which in turn will operate a relay for activating an external strobe (not shown). Any mounting means, such as the ridge 8 and tab 12, can be used to mount the accessory to the camera.

It is to be understood that the above described embodiments are merely illustrative of the present invention and represent a limited number of the possible specific embodiments that can provide applications of the principles of the invention. Numerous and varied other arrangements may be readily devised in accordance with these principles by those skilled in the art without departing from the spirit and scope of the invention as claimed.

What is claimed is:

1. A camera accessory for controlling an external strobe of a camera having an electronic built-in flash, said camera accessory comprising:

a section comprising means for blocking light of said electronic built-in flash from being cast upon a scene to be photographed, a connector mounted on said section and an optical sensing device connected to said connector which, upon detecting light emitted from said electronic built-in flash, activates said external strobe; and means for mounting said camera accessory to said camera.

2. The camera accessory of claim 1 further comprising means for redirecting the blocked light away from both said camera and the scene to be imaged by said camera.

3. The camera accessory of claim 2 wherein said redirecting means comprises a cutout having louvers for redirecting the blocked light.

4. The camera accessory of claim 3 further comprising a reflective material for reflecting the blocked light.

5. The camera accessory of claim 1, wherein said external strobe is connected to said connector via a cable.

6. A camera accessory for controlling an external strobe of a camera having an electronic built-in flash, said camera accessory comprising:

a lens opening for providing unobstructed operation of a lens of said camera;

a viewfinder opening for providing unobstructed operation of a viewfinder of said camera;

a sonar opening for providing unobstructed operation of a sonar device of said camera;

a section comprising means for blocking light of said electronic built-in flash from being cast upon a scene to be photographed, a connector mounted on said section and an optical sensing device connected to said connector which, upon detecting light emitted from said electronic built-in flash, activates said external strobe; and means for mounting said camera accessory to said camera.

7. The camera accessory of claim 6 further comprising a slot for inserting a filter in front of said lens of said camera.

8. The camera accessory of claim 6 further comprising a lens shade.

9. The camera accessory of claim 6 wherein said mounting means comprises a mounting tab having a snap-in ridge for engaging with said camera.

10. The camera accessory of claim 6 further comprising means for redirecting the blocked light away from both said camera and the scene to be imaged by said camera.

11. The camera accessory of claim 10 wherein said redirecting means comprises a cutout having louvers for redirecting the blocked light.

12. The camera accessory of claim 11 further comprising a reflective material for reflecting the blocked light.

* * * * *